United States Patent [19]

Bethea et al.

[11] Patent Number: 4,814,411

[45] Date of Patent: Mar. 21, 1989

[54] INCREASED REACTIVITY OF ISOCYANATE TERMINATED POLYETHER PREPOLYMERS WITH METAL HALIDE SALT COMPLEXES OF METHYLENEDIANILINE

[75] Inventors: Tristram W. Bethea; James Oziomek; Joseph H. Tazewell, all of Akron, Ohio; Douglas K. Hillshafer, Cheshire, Conn.; Louis W. Meyer, Livingston, Tex.

[73] Assignees: The Firestone Tire & Rubber Company, Akron, Ohio; The Dow Chemical Company, Midland, Mich.

[21] Appl. No.: 153,233

[22] Filed: Feb. 8, 1988

[51] Int. Cl.[4] .............................................. C08G 18/10
[52] U.S. Cl. ....................................... 528/64; 528/66; 528/76
[58] Field of Search ............................. 528/64, 66, 76

[56] References Cited

U.S. PATENT DOCUMENTS

| | | | |
|---|---|---|---|
| 3,755,261 | 8/1973 | Van Gulick | 260/77.5 |
| 4,330,454 | 5/1982 | Kimball | 524/773 |
| 4,463,155 | 7/1984 | Kibler | 528/61 |
| 4,517,331 | 5/1985 | Parker et al. | 524/451 |

Primary Examiner—Maurice J. Welsh
Attorney, Agent, or Firm—Renner, Kenner, Greive, Bobak, Taylor & Weber

[57] ABSTRACT

Increased reactivity of isocyanate terminated polyether prepolymers with metal halide salt complexes of methylenedianiline is obtained when the polyether intermediates are modified to contain an effective amount of ethylene oxide. A desired intermediate is poly(oxypropylene) diol or triol which are modified to contain ethylene oxide units therein and subsequently reacted with a polyisocyanate such as MDI, that is 4,4'-diphenylmethane diisocyanate, or TDI, that is, toluene diisocyanate. A desired metal halide salt complex of methylenedianiline is the sodium chloride salt complex ($MDA_3$-NaCl), dispersed in dioctylphthalate (50/50 wt/wt).

33 Claims, 1 Drawing Sheet

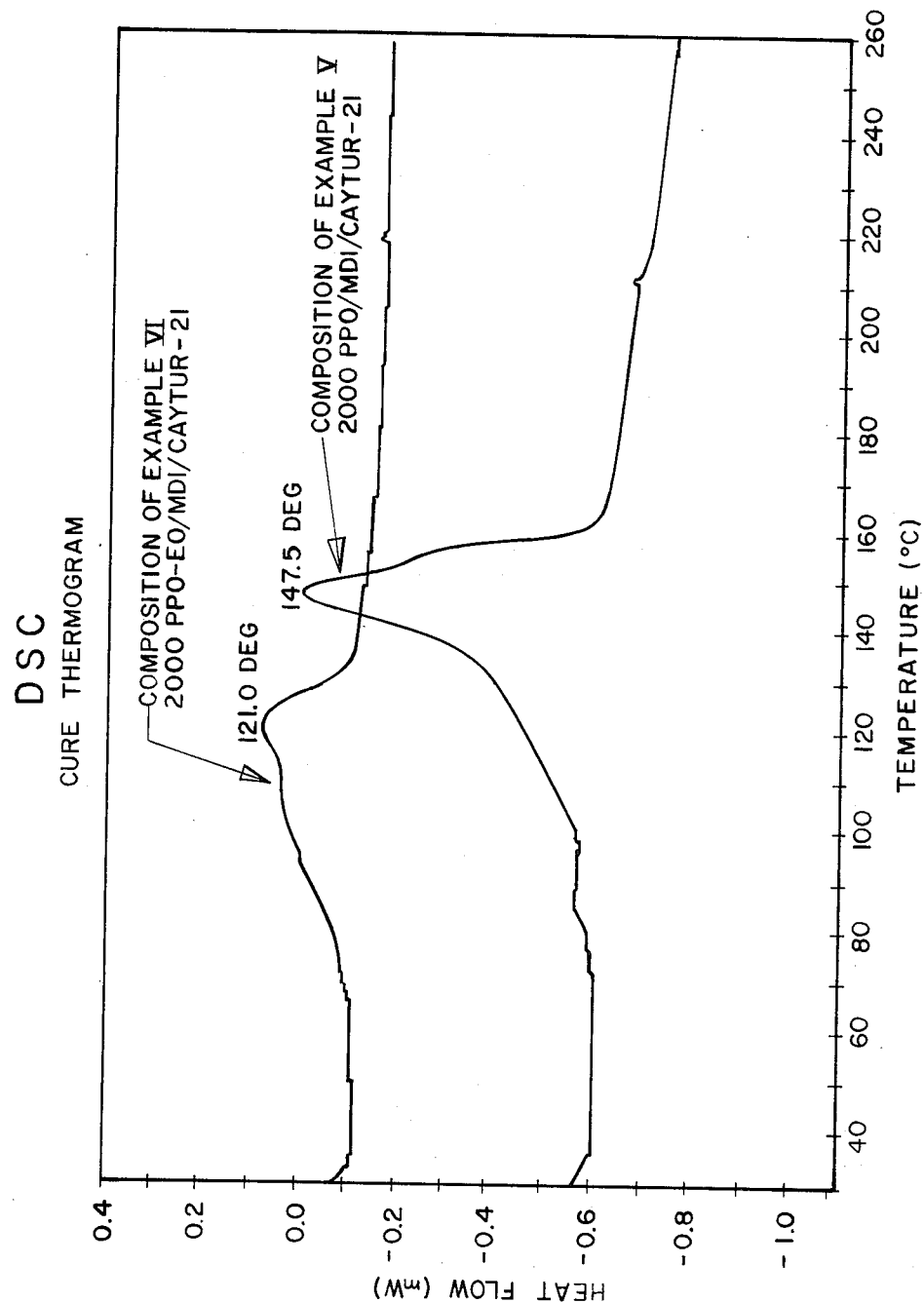

1

INCREASED REACTIVITY OF ISOCYANATE TERMINATED POLYETHER PREPOLYMERS WITH METAL HALIDE SALT COMPLEXES OF METHYLENEDIANILINE

FIELD OF THE INVENTION

The present invention relates to providing isocyanate terminated polyether prepolymer compositions which are readily cured with metal salt complexes of methylenedianiline (MDA).

BACKGROUND ART

Heretofore, polytetrahydrofuran-toluene diisocyanate prepolymers were readily cured with metal halide salt complexes of methylenedianiline, generally dispersed in a plasticizer. However, cure with polyether intermediates having substituted alkyl oxyethylene repeating units was rather slow and yielded end products having poor physical properties.

U.S. Pat. No. 3,755,261 to VanGulick relates to the use of metal halide salt complexes of methylenedianiline in the cure of urethane polymers.

U.S. Pat. No. 4,330,454 to Kimball relates to a storable, flowable polypropylene ether urethane composition having a relatively long shelf life which is made by reacting polypropylene ether glycol with MDI and cure with metal halide salt complexes of MDA.

U.S. Pat. No. 4,463,155 to Kibler relates to a polyurethane-urea derived from the reaction of a polyether diol such as polytetrahydrofuran diol with a polyether diisocyanate prepolymer with simultaneous chain extension utilizing a metal halide salt complex of MDA.

U.S. Pat. No. 4,517,331 to Parker et al, relates to a storable polypropylene ether polyurethane composition made from a prepolymer of a polypropylene ether glycol and an organic polyisocyanate which is cured with metal halide salt complexes of MDA in association with a crown or pseudocrown ether catalysts.

The above patents failed to recognize that ethylene oxide units contained in a polyether intermediate having ethylene oxide units therein would increase the reactivity of the prepolymers made therefrom with metal halide salt complexes of MDA.

SUMMARY OF THE INVENTION

It is therefore an aspect of the present invention to provide for the increased reactivity in a polyurethane-urea cure utilizing metal halide salt complexes of MDA and a prepolymer made from a polyether intermediate having an alkyl substituted oxyethylene repeating unit and containing ethylene oxide units therein.

It is another aspect of the present invention to provide for a metal halide salt complex of an MDA salt complex cure of a prepolymer, as above, wherein a polyurethane-urea is produced having good integrity throughout as well as improved tensile strength, flexural strength, and the like, without the addition of any catalytic agents to the curing reaction.

These and other aspects of the present invention will become apparent from the following detailed specification.

In general, an isocyanate terminated polyether prepolymer comprises the prepolymer, said prepolymer made from a polyisocyanate and a hydroxyl terminated polyether intermediate containing an effective amount of ethylene oxide therein to increase the reactivity of said prepolymer with a metal halide salt complex of methylenedianiline, said polyether intermediate having alkyl substituted oxyethylene repeating units.

BRIEF DESCRIPTION OF THE DRAWINGS

FIG. 1 is a chart showing differential scanning calorimetry curves of the cures of Examples V and VI.

DETAILED DESCRIPTION OF THE INVENTION

The polyether intermediates are generally conventional polyethers, that is, a poly(oxyalkylene) polyol and hence, are made from polyhydric alcohol initiators having from 2 to about 6 carbon atoms or water with various oxiranes containing 3 or more carbon atoms. The preparation of such compounds are well known to the art as well as to the literature and, hence, will not be discussed in detail. The end result is a hydroxyl terminated poly(oxyalkylene) polyol. The polyhydric alcohol contains from 2 to about 6 hydroxyl groups with 2 or 3 hydroxyl groups (i.e. a diol or a triol) being preferred. The polyhydric alcohol initiators include ethylene glycol, propylene glycol, glycerin, pentaerythritol, arabitol, sorbitol, and the like. The poly(oxyalkylene) groups are generally derived from alkyl substituted oxiranes and contain a total of 3 to about 6 carbon atoms therein. Examples of suitable oxiranes include propylene oxide, butylene oxide, and the like. When reacted, the hydroxyl terminated poly(oxyalkylene) polyols, hereinafter referred to as polyether intermdiates, had an alkyl substituted oxyethylene repeating unit therein with the alkyl group having from 1 to 4 carbon atoms. In the present invention, a hydroxyl terminated poly(oxypropylene) diol or triol, or combinations thereof, are preferred.

It has been found that the reactivity of the prepolymer with metal halide salt complexes of MDA is improved or increased when ethylene oxide is incorporated into the polyether. In other words, the rate of decomposition and temperature of decomposition of the metal salt complex of MDA is improved. However, the addition of excessive ethylene oxide is avoided in that ethylene oxide is water soluble and a hydrophilic segment in the final product generally is not desired. Excessive ethylene oxide moreover causes a change of various properties such as increased water sensitivity and increased glass transition temperature.

A suitable manner of adding ethylene oxide to the polyether intermediates is to end cap the same. That is, block copolymers are formed with at least one ethylene oxide block on many or a predominate number of the polyether intermediate chain ends. An effective increase in reactivity is generally obtained when many, that is, a substantial number of the various intermediates have an average of at least 1 to about 20 ethylene oxide units thereon and preferably from about 4 to about 10 units. That is, of the large number of individual intermediate molecules prepared, the ethylene oxide end caps, on the average, will have at least 1 to a maximum of approximately 20 repeating ethylene oxide units therein.

Another type of ethylene oxide containing polyether intermediate is essentially a random copolymer made by adding the alkyl substituted oxyethylene such as propylene oxide and the ethylene oxide together and causing a reaction to proceed. A third type of ethylene oxide containing polyether intermediates involves alternating the feed of propylene oxide and ethylene oxide and reacting the same until a desired copolymer is produced. In effect, a mini block copolymer is produced.

Regardless of whether an essentially random copolymer, or a multiple mini block copolymer, or a block copolymer is utilized, the amount of ethylene oxide contained therein to effect increased reactivity of the prepolymer, is from about 2 percent to about 60 weight percent, desirably from about 8 percent to about 25 weight percent, and preferably from about 12 percent to about 20 weight percent.

Regardless of the exact nature or type of ethylene oxide containing polyether intermediates, such compounds are known to the art as well as to the literature. For example, preparation of such compounds generally proceed via anionic polymerization and, hence, utilize a basic catalyst such as potassium hydroxide, and the like. Examples of specific ethylene oxide containing polyethers include the various Voranols such as Voranol 4702, Voranol 2471, Voranol 4815, Voranol 5148, Voranol 5287 and Voranol 3137, all produced by the Dow Chemical Company. Voranol is a trademark of Dow. The ethylene oxide containing polyether intermediate generally has an equivalent weight range of from about 200 to about 8,000, desirably from about 250 to about 4,000 and preferably from about 500 to about 3,600.

The ethylene oxide containing polyether intermediates are reacted with a conventional polyisocyanate to form the prepolymer. Suitable polyisocyanates include those having the formula R—(N=C=O)$_n$ where R is an aliphatic or desirably an alkyl containing from about 2 to about 20 carbon atoms, preferably from 2 to about 10 carbon atoms, or a cycloaliphatic containing from about 5 to about 20 carbon atoms and desirably a cycloalkyl containing from 5 to about 12 carbon atoms, or an aromatic or an alkyl substituted aromatic containing from 6 to about 20 carbon atoms, and preferably from about 6 to about 14 carbon atoms. Desirably R is an aromatic or an alkyl substituted aromatic. The number of isocyanate groups, that is "n" is an integer such as 2 or 3 or even higher, with 2 being highly preferred. Examples of diisocyanates include the 4,4'-diphenyl diisocyanates, para-phenylene diisocyanate, the various toluene diisocyanates (TDI), the various bitolylene diisocyanates, the various naphthalene diisocyanates such as 1,5-naphthylene diisocyanate and 2,6-naphthylene diisocyanate; and MDI, that is 4,4'-diphenylmethane diisocyanate. MDI and TDI are preferred.

Inasmuch as prepolymers are desired containing essentially N=C=O end groups thereon, an excess of the polyisocyanate is utilized. Desirably, an amount of polyisocyanate is utilized such that from about 2 to about 10 weight percent and desirably from about 3 to about 8 weight percent of free isocyanates are present based upon the weight of the prepolymer. The reaction conditions between the polyisocyanate such as MDI or TDI and the ethylene oxide containing polyether intermediate are generally known to those skilled in the art and to the literature. An exemplary temperature range is from about ambient to about 100° C., desirably from about 40° C. to about 90° C., and preferably from about 60° C. to about 80° C. At low temperatures, the reaction becomes slow. High temperatures are generally avoided since undesirable side reactions tend to commence. The reaction moreover can be generally carried out at atmospheric pressure or under slight pressure, usually in the presence of a dry inert gas such as nitrogen.

The prepolymers of the present invention are cured with a metal halide salt complex of MDA, that is 4,4'-methylene-dianiline. Various salts can be utilized with MDA such as sodium chloride, sodium bromide, sodium iodide, sodium nitrite, lithium chloride, lithium bromide, lithium iodide, lithium nitrite, and sodium cyanide with sodium chloride being preferred. A description of MDA and the various salt complexes thereof which can be utilized in the present invention is set forth in U.S. Pat. No. 3,755,261 to Van Gulick, which is hereby fully incorporated by reference. Cure of the prepolymer generally takes place at a temperature of from about 100° C. to about 150° C., and preferably from about 130° C. to about 140° C. under anhydrous conditions.

The increased reactivity and, hence, improved cure rate and reduced temperature of cure is achieved without the use of any added catalysts. That is, the increased reactivity is achieved by reactants which are free of any catalyst such as a crown ether. Moreover, the polyurethane-urea which is obtained has improved physical properties such as heat stability, flexural strength, hardness, tensile strength, and the like. Accordingly, the polyurethane-urea can be utilized wherever structural materials are desired, for example high performance materials such as drive belts, conveyor belts, tires, bearings, wheels, and the like.

The invention will be better understood by reference to the following Examples.

EXAMPLE I

Prepolymer Formation

A prepolymer was formed by slowly adding 1,409.89 grams of Voranol 5120, a 2,000 molecular weight polypropylene glycol, manufactured by the Dow Chemical Company containing no ethylene oxide therein, to 390.14 grams of toluene diisocyanate (TDI) at 50° C. over a period of two hours. The addition was done while the TDI was being stirred under nitrogen atmosphere. After the final reaction of the polyol, the mixture was stirred and heated for an additional two hours at 50° C. and then allowed to cool to approximately 23° C. The final NCO content was 7.3 percent based upon the weight of the prepolymer.

EXAMPLE II

Prepolymer Formation and Cure

A prepolymer was formed utilizing the same procedure in Example I except that the polyol was replaced with the copolymerization product of ethylene oxide-propylene oxide (40/60 weight ratio feed) to achieve an intermediate having a molecular weight of approximately 1,900.

To 1900 grams of the prepolymer of Example I, 75.43 grams of Caytur 21, the sodium chloride complex of methylenedianiline dispersed in DOP and manufactured by E. I. DuPont, was added and stirred by hand for one minute. The blend was then poured into a ⅛" thick aluminum mold previously heated to 121° C. The mold and its contents were then placed in a 121° C. oven. After one hour, the mold was removed from the oven and the Example I urethane was removed and allowed to equilibrate to room temperature.

In the same manner, 200 grams of the prepolymer of Example II was hand mixed with 68.7 grams of Caytur 21. The mixture was cast, cured, and demolded as above. The urethane of Example II thus was made from an ethylene oxide containing intermediate.

After several days at 23° C., the urethanes of Examples I and II were inspected. The urethane of Example I was too cheesy to cut for determining properties according to ASTM procedures. However, the urethane of Example II yielded the following results:

Flexural Modulus: 3,590 psi
Tensile Strength: 628 psi
Percent Elongation: 433 percent
Tear Strength: 236#/linear inch It can thus be seen that the urethane polymers of the present invention were effectively cured and exhibited desirable properties over the urethane made from an intermediate not containing any ethylene oxide groups therein.

EXAMPLE III

Preparation 2000 Mol Wt Diol/Mdi Prepolymer

Into a 5,000 ml. three-necked, round bottom flask, equipped with stirrer, pressure equilibrating dropping funnel, thermometer, nitrogen bubbler and heating mantle, was added 969 grams of molten 4,4'-diphenylmethane diisocyanate (MDI) (Isonate 125M, a product of The Dow Chemical Co.), maintained at 70° C. While maintaining a blanket of dry nitrogen in the reaction vessel, 2031.0 grams of dry 2000 molecular weight polypropyleneoxide diol (56.5 hydroxyl number) (Voranol 5120, a product of Dow Chemical Company) was added dropwise to the stirred MDI, at a rate so as not to exceed a temperature of 75° C. The reaction mixture was stirred and maintained at 70° C. for two hours, while continuing to heat after all of the polyol had been added. The prepolymer was then held under about 1.0 mm Hg pressure, with stirring for two hours. The resultant prepolymer had a free isocyanate content of 8.07 percent.

EXAMPLE IV

Preparation of 2000 Mw Ethylene Oxide Capped Diol/Mdi Prepolymer

Into a 5000 ml three-necked, round bottom flask, equipped with stirrer, pressure equilibrating dropping funnel, thermometer, nitrogen bubbler and heating mantle, was weighed 789.6 g of molten 4,4'-diphenylmethane diisocyanate (MDI) (Isonate 125M, a product of The Dow Chemical Co.), maintained at 70° C. While maintaining a blanket of dry nitrogen in the reaction vessel, 1610.4 g of dry 2000 MW polypropyleneoxide/ethylene oxide endcapped diol (56.7 hydroxyl number), Voranol 5287 (a product of Dow Chemical Company), was added dropwise to the stirred MDI, at a rate so as not to exceed 75° C. The reaction mixture was stirred and maintained at 70° C. for two hours after all of the polyol had been added. The prepolymer was then held under about 1.0 mm Hg pressure, with stirring, for two additional hours, while continuing to heat. The resultant prepolymer had a free isocyanate content of 8.07.

EXAMPLE V

Cure of Prepolymer of Example III

Into a dry 500 ml, three-necked, round bottom flask, equipped with stirrer, thermometer, heating mantle, nitrogen bubbler and vacuum inlet, was weighed 178.4 g of 2000 mw polypropylene oxide diol/MDI prepolymer (8.07 percent NCO), prepared as described in Example III. To the homogeneously mixed and stirred prepolymer, under a dry nitrogen blanket, was added from a tared syringe 71.6 g of Caytur 21. Vacuum of about 1.0 mm Hg was applied gradually and the mixture temperature was raised to 40° C., over a period of 20 minutes. Vacuum was broken with nitrogen and the mixture was cast into a mold, preheated to 135° C., and then cured in a hydraulic laboratory press at 135° C. The composition was not cured even after 16 hours. An acceptable cure time would have been 60 minutes. The lower line of FIG. 1 shows the DSC of this cure and indicates that at 135° C. only a small portion of the cure has occurred.

EXAMPLE VI

Cure of Prepolymer of Example IV

Into a dry 500 ml, three-necked, round bottom flask, equipped with stirrer, thermometer, heating mantle, nitrogen bubbler and vacuum, was weighed 175.8 g of 2000 mw polypropylene oxide-ethylene oxide capped diol/MDI prepolymer (8.07 percent NCO), prepared as described in Example IV. To the homogeneously mixed and stirred prepolymer, under a dry nitrogen blanket, was added from a tared syringe 74.2 g of Caytur 21. Vacuum of about 1.0 mm Hg was applied gradually and the mixture temperature was raised to 40° C., over a period of 20 minutes. Vacuum was broken with nitrogen and the mixture was cast into a mold, preheated to 135° C., and then cured in a hydraulic laboratory press at 135° C. for 60 minutes. The composition was fully cured at this time. The cured elastomer had a tensile strength of 1439 psi and elongation at break of 107 percent. The upper line of FIG. 1 shows the DSC of this cure and indicates that essentially all of the cure has occurred under 135° C.

Comparative differential scanning calorimetry (DSC) curves of the cures of Examples V and VI (FIG. 1), show that the composition containing the ethylene oxide endblock (Example VI) to cure at a lower temperature (121.0° C. peak cure temperature) compared to the composition containing the polypropylene oxide without ethylene oxide endblocking (147.5° C. peak cure temperature.

While in accordance with the Patent Statutes, the best mode and preferred embodiment have been set forth, the scope of the invention is not limited thereto, but rather by the scope of the attached claims.

What is claimed is:

1. An isocyanate terminated polyether prepolymer, comprising:
   the prepolymer, said prepolymer made from a polyisocyanate and a hydroxyl terminated polyether intermediate containing a polyethylene oxide end block having an average number of at least about 4 ethylene oxide terminal units therein to increase the reactivity of said prepolymer with a metal halide salt complex of methylenedianiline, said polyether intermediate having alkyl substitute oxyethylene repeating units.

2. An isocyanate terminated polyether prepolymer according to claim 1, wherein said alkyl substituent of said alkyl substituted oxyethylene contains from 1 to 4 carbon atoms, and wherein the amount of said ethylene oxide is from about 2 percent to about 60 percent by weight based upon the weight of said prepolymer.

3. An isocyanate terminated polyether prepolymer according to claim 2, and wherein said polyisocyanate has the formula R—(N=C=O)$_n$, wherein R is an aliphatic group having from 2 to about 20 carbon atoms, a cycloaliphatic group having from 5 to about 20 carbon atoms, an aromatic or an alkyl substituted aromatic group having from 6 to about 20 carbon atoms, and wherein n is 2 or 3.

4. An isocyanate terminated polyether prepolymer according to claim 3, wherein the equivalent weight of said polyether is from about 200 to about 8,000.

5. An isocyanate terminated polyether prepolymer according to claim 4, wherein said polyisocyanate is a diphenyl diisocyanate, a phenylene diisocyanate, a bitolylene diisocyanate, a naphthalene diisocyanate, a diphenylmethane diisocyanate or a toluene diisocyanate, wherein said prepolymer contains from about 2 percent to about 10 percent by weight of free polyisocyanate based upon the weight of said prepolymer.

6. An isocyanate terminated polyether prepolymer according to claim 5, wherein said alkyl substituent of said alkyl substituted oxyethylene repeating units is methyl, wherein said polyether intermediate containing said oxyethylene repeating units has an equivalent weight from about 500 to about 3,600, wherein said polyisocyanate is said diphenylmethane diisocyanate, or said toluene diisocyanate, wherein said amount of said free polyisocyanate is from about 3 percent to about 8 percent by weight, and wherein said salt of said methylenedianiline salt complex is sodium chloride.

7. An isocyanate terminated polyether prepolymer according to claim 1, wherein the average number of ethylene oxide units in each said end block is from about 4 to about 20.

8. An isocyanate terminated polyether prepolymer according to claim 7, wherein the average number of ethylene oxide units in each said end block is from about 4 to about 10.

9. An isocyanate terminated polyether prepolymer according to claim 6, wherein said intermediate is a multiple block copolymer of said ethylene oxide and said polyether or a random copolymer of said ethylene oxide and said polyether and contains from about 8 percent to about 25 percent by weight of ethylene oxide groups therein.

10. A polyurethane-urea comprising:
a prepolymer, said prepolymer made from a polyether intermediate containing ethylene oxide units existing substantially as end blocks on said polyether, and wherein the average number of ethylene oxide units in each said end block is at least about 4 and a polyisocyanate, said polyether intermediate having alkyl substituted oxyethylene repeating units, and a metal halide salt complex of methylenedianiline, said ethylene oxide units of said polyether imparting a reduced temperature of decomposition to said methylenedianiline salt complex.

11. A polyurethane-urea according to claim 10, wherein said alkyl substituent of said oxyethylene contains from 1 to 4 carbon atoms, and wherein said polyisocyanate has the formula R—(N=C=O)$_n$ wherein R is an aliphatic group having from 2 to about 20 carbon atoms, a cycloaliphatic group having from 5 to about 20 carbon atoms, an aromatic or an alkyl substituted aromatic group having from 6 to about 20 carbon atoms, and wherein n is 2 or 3.

12. A polyurethane-urea according to claim 11, wherein said polyisocyanate is a diphenyl diisocyanate, a para-phenylene diisocyanate, a diphenylmethane diisocyanate, a bitolylene diisocyanate, a naphthalene diisocyanate, or toluene diisocyanate, and wherein the amount of said ethylene oxide units is from about 2 percent to about 60 percent by weight based upon the weight of said prepolymer.

13. A polyurethane-area according to claim 12, wherein the equivalent weight of said polyether is from about 200 to about 8000.

14. A polyurethane-urea according to claim 13, wherein said prepolymer contains from about 2 percent to about 10 percent by weight of free polyisocyanate based upon the weight of said prepolymer.

15. A polyurethane-urea according to claim 14, wherein said alkyl substituent of said alkyl substituted oxyethylene repeating unit is methyl, wherein said equivalent weight of said polyether is from about 200 to about 4,000, wherein said polyisocyanate is diphenylmethane diisocyanate or toluene diisocyanate, wherein said amount of said free polyisocyanate is from about 3 percent to about 8 percent by weight, and wherein said salt complex of said methylenedianiline is sodium chloride.

16. A polyurethane-urea according to claim 11, wherein said intermediate is a multiple block copolymer of said ethylene oxide and said polyether or a random copolymer of said ethylene oxide and said polyether and contains from about 8 percent to about 25 percent by weight of ethylene oxide groups therein.

17. A polyurethane-urea according to claim 15, wherein said intermediate is a multiple block copolymer of said ethylene oxide and said polyether or a random copolymer of said ethylene oxide and said polyether and contains from about 12 percent to about 20 percent by weight of ethylene oxide groups therein.

18. An isocyanate terminated polyether prepolymer, comprising:
the prepolymer, said prepolymer made from a polyisocyanate and a hydroxyl terminated polyether intermediate which comprises a multiple block copolymer of said ethylene oxide and said polyether or a random copolymer of said ethylene oxide and said polyether and which contains at least about 8 percent to about 25 percent by weight of ethylene oxide groups therein to increase the reactivity of said prepolymer with a metal halide salt complex of methylenedianiline, said polyether intermediate having alkyl substituted oxyethylene repeating units.

19. An isocyanate terminated polyether prepolymer according to claim 18, wherein said alkyl substituent of said alkyl substituted oxyethylene contains from 1 to 4 carbon atoms, and wherein the amount of said ethylene oxide is from about 2 percent to about 60 percent by weight based upon the weight of said prepolymer.

20. An isocyanate terminated polyether prepolymer according to claim 19, and wherein said polyisocyanate has the formula R—(N=C=O)$_n$, wherein R is an aliphatic group having from 2 to about 20 carbon atoms, a cycloaliphatic group having from 5 to about 20 carbon atoms, an aromatic or an alkyl substituted aromatic group having from 6 to about 20 carbon atoms, and wherein n is 2 or 3.

21. An isocyanate terminated polyether prepolymer according to claim 20, wherein the equivalent weight of said polyether is from about 200 to about 8,000.

22. An isocyanate terminated polyether prepolymer according to claim 21, wherein said polyisocyanate is a diphenyl diisocyanate, a phenylene diisocyanate, a bitolylene diisocyanate, a naphthalene diisocyanate, a diphenylmethane diisocyanate or a toluene diisocyanate, wherein said prepolymer contains from about 2 percent to about 10 percent by weight of free polyisocyanate based upon the weight of said prepolymer.

23. An isocyanate terminated polyether prepolymer accordng to claim 22, wherein said alkyl substituent of said alkyl substituted oxyethylene repeating units is methyl, wherein said polyether intermediate containing said oxyethylene repeating units has an equivalent weight from about 500 to about 3,600, wherein said polyisocyanate is said diphenylmethane diisocyanate, or said toluene diisocyanate, wherein said amount of said free polyisocyanate is from about 3 percent to about 8 percent by weight, and wherein said salt of said methylenedianiline salt complex is sodium chloride.

24. An isocyanate terminated polyether prepolymer according to claim 18, wherein said intermediate contains from about 8 percent to about 25 percent by weight of ethylene oxide groups therein.

25. An isocyanate terminated polyether prepolymer according to claim 24, wherein said intermediate contains from about 12 percent to about 20 percent by weight of ethylene oxide groups therein.

26. A polyurethane-urea comprising:
a prepolymer, said prepolymer made from a polyisocyanate and a polyether intermediate comprising a multiple block copolymer of ethylene oxide and said polyether or a random copolymer of ethylene oxide and said polyether and containing at least about 8 percent to about 25 percent by weight of ethylene oxide groups, said polyether intermediate having alkyl substituted oxyethylene repeating units, and a metal halide salt complex of methylenedianiline, said ethylene oxide groups of said polyether imparting a reduced temperature of decomposition of said methylenedianiline salt complex.

27. A polyurethane-urea according to claim 26, wherein said alkyl substituent of said oxyethylene contains from 1 to 4 carbon atoms, and wherein said polyisocyanate has the formula R—(N=C=O)$_n$, wherein R is an aliphatic group having from 2 to about 20 carbon atoms, a cycloaliphatic group having from 5 to about 20 carbon atoms, an aromatic or an alkyl substituted aromatic group having from 6 to about 20 carbon atoms, and wherein n is 3 or 3.

28. A polyurethane-urea according to claim 27, wherein said polyisocyanate is a diphenyl diisocyanate, a para-phenylene diisocyanate, a diphenylmethane diisocyanate, a bitolylene diisocyanate, a naphthalene diisocyanate, or toluene diisocyanate, and wherein the amount of said ethylene oxide units is from about 2 percent to about 60 percent by weight based upon the weight of said prepolymer.

29. A polyurethane-urea according to claim 28, wherein the equivalent weight of said polyether is from about 200 to about 8000.

30. A polyurethane-urea according to claim 29, wherein said prepolymer contains from about 2 percent to about 10 percent by weight of free polyisocyanate based upon the weight of said prepolymer.

31. A polyurethane-urea according to claim 30, wherein said alkyl substituent of said alkyl substituted oxyethylene repeating unit is methyl, wherein said equivalent weight of said polyether is from about 200 to about 4,000, wherein said polyisocyanate is diphenylmethane diisocyanate or toluene diisocyanate, wherein said amount of said free polyisocyanate is from about 3 percent to about 8 percent by weight, and wherein said salt complex of said methylenedianiline is sodium chloride.

32. A polyurethane-urea according to claim 26, wherein said intermediate contains from about 8 percent to about 25 percent by weight of ethylene oxide groups therein.

33. A polyurethane-urea according to claim 32, wherein said intermediate contains from about 12 percent to about 20 percent by weight of ethylene oxide groups therein.

* * * * *